United States Patent
Mullinix et al.

(10) Patent No.: US 7,152,839 B2
(45) Date of Patent: *Dec. 26, 2006

(54) VEHICLE SEATING SYSTEM WITH IMPROVED VIBRATION ISOLATION

(75) Inventors: Logan E. Mullinix, Vonore, TN (US); George Thomas Hardin, Knoxville, TN (US); Todd Troutt, Seymour, TN (US)

(73) Assignee: National Seating Company, Inc., Vonore, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/079,699

(22) Filed: Mar. 14, 2005

(65) Prior Publication Data

US 2005/0156093 A1    Jul. 21, 2005

Related U.S. Application Data

(63) Continuation of application No. 10/369,357, filed on Feb. 18, 2003, now Pat. No. 6,866,236.

(51) Int. Cl.
*F16M 13/00* (2006.01)
(52) U.S. Cl. .................... 248/421; 248/575; 248/588; 248/636
(58) Field of Classification Search .............. 248/421, 248/588, 575, 636, 550, 585, 631, 429, 569; 297/340, 344.15, 369; 267/131, 133
See application file for complete search history.

(56) References Cited

U.S. PATENT DOCUMENTS

| | | | | |
|---|---|---|---|---|
| 3,954,245 | A | * | 5/1976 | Costin .......................... 248/550 |
| 3,957,243 | A | * | 5/1976 | Costin et al. ................ 248/370 |
| 4,228,984 | A | * | 10/1980 | Thompson et al. .......... 248/636 |
| 4,461,444 | A | * | 7/1984 | Grassl et al. ................ 248/550 |
| 4,729,539 | A | * | 3/1988 | Nagata ......................... 248/575 |
| 4,943,037 | A | * | 7/1990 | Brodersen et al. ........... 267/131 |
| 5,014,960 | A | * | 5/1991 | Kimura ....................... 248/602 |
| 5,154,402 | A | * | 10/1992 | Hill et al. .................... 267/133 |
| 5,285,992 | A | | 2/1994 | Brown |
| 5,542,638 | A | * | 8/1996 | Smith .......................... 248/421 |
| 5,651,585 | A | * | 7/1997 | Van Duser ............. 297/344.16 |
| 5,927,679 | A | * | 7/1999 | Hill .............................. 248/588 |
| 5,950,977 | A | | 9/1999 | Proksch et al. |
| 6,135,412 | A | | 10/2000 | Buehler |
| 6,264,163 | B1 | * | 7/2001 | Ivarsson ...................... 248/588 |
| 6,371,456 | B1 | * | 4/2002 | Ritchie et al. ........... 267/64.12 |
| 6,550,740 | B1 | | 4/2003 | Burer |

* cited by examiner

*Primary Examiner*—Anita M. King
(74) *Attorney, Agent, or Firm*—Fitch, Even, Tabin & Flannery

(57) ABSTRACT

A vehicle seating system includes a top frame for mounting to a vehicle seat. A bottom frame is provided for mounting to the vehicle and a middle frame or linking system movably mounts the top frame to the bottom frame. The middle frame includes two pair of scissor arms with rollers at the ends of the scissor arms. The top frame has four corners with roller tracks at each corner. The bottom frame also has four corners with roller tracks at each corner. Included among the roller tracks of the top and bottom frames is a single pair of curvilinear tracks, a pair of pivotal connecting tracks and two pair of linear tracks. A regulator system is also disclosed to regulate the amount of fore and aft travel of the top frame.

4 Claims, 11 Drawing Sheets

VEHICLE SEATING SYSTEM WITH IMPROVED VIBRATION ISOLATION

CROSS-REFERENCE TO RELATED APPLICATION

This is a continuation of prior application Ser. No. 10/369,357, filed Feb. 18, 2003 now U.S. Pat. No. 6,866,236, which is hereby incorporated herein by reference in its entirety.

FIELD OF THE INVENTION

The present invention pertains to vehicle seats and in particular to vehicle seating arrangements which isolate passengers from vibrations carried through the vehicle structure.

BACKGROUND OF THE INVENTION

Commercial vehicles have suspension systems which differ from passenger vehicles in their construction and response to vibration. Oftentimes, suspension systems in commercial vehicles are specially designed for the intended use of the commercial vehicle. Large trucks, for example, handle heavy loads and when trade offs arise between work capability of a commercial vehicle and an occupant's comfort, the decision is usually made to favor the performance capability of the commercial vehicle. As a result, occupants of commercial vehicles, which include drivers, suffer from aggravated discomfort and fatigue arising from exposure to vehicle vibrations. It is well known to provide some sort of amelioration of vibration-induced problems, usually associated with the seating for the driver, and less often for the other vehicle occupants. Frequently, commercial vehicles are operated with only a single occupant, the driver, and improvements in seating have focused to a large extent on driver's seats. The goal of ameliorating systems is to selectively absorb vibrational energy and to channel or dissipate the unwanted energy away from the driver's anatomy. Usually, vibrations arriving at a driver's seat bear directional characteristics, and improvements to seating designs take advantage of this fact by restricting seating improvements to a particular type of vibration problem. For example, seating improvements have been directed to improvements in providing fore and aft isolation and vertical isolation. By focusing isolation systems in this manner, it is hoped that the size of the isolation systems will not be so large as to require modification of the vehicle, due to increased height under a passenger's seat, for example.

It is an object of the present invention to provide fore and aft isolation and vertical isolation for new and existing seating arrangements.

Another object of the present invention is to provide improvements in the amount of isolation, using inexpensive components and cost-effective fabrication techniques.

A further object of the present invention is to provide a user-selectable control over the fore and aft motion of the seating system.

Yet another object of the present invention is to provide automatic adjustment of fore and aft motion control and vertical motion control proportional to the weight of the driver.

DETAILED DESCRIPTION OF THE PREFERRED EMBODIMENTS

Figure 1:
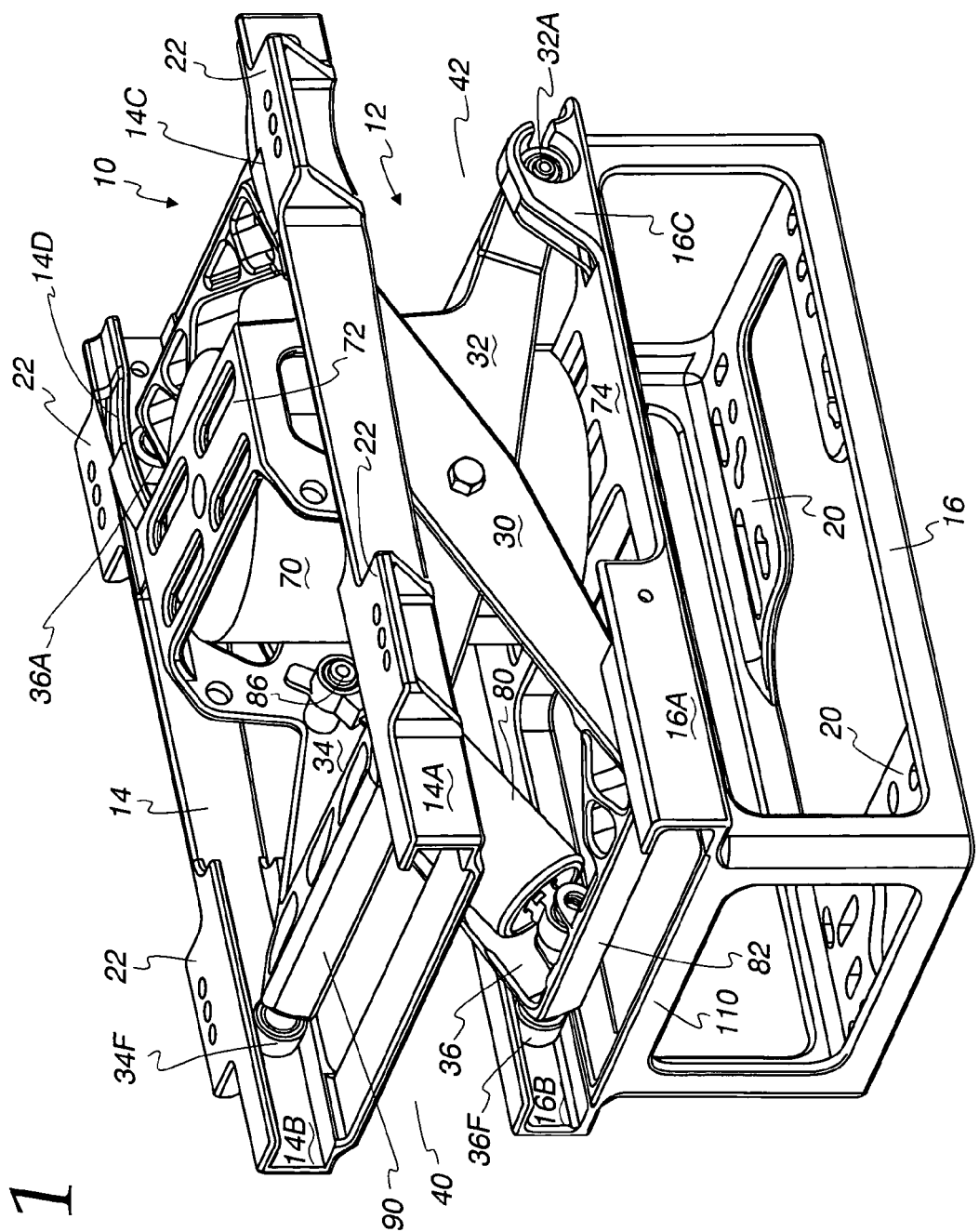
FIGS. 1–4 are perspective views of a vehicle seating system according to principles of the present invention.

Referring now to the drawings and initially to FIGS. 1–8 a vehicle seating system is generally indicated at 10. Included is a linking system or middle frame 12 movably connecting a top frame 14 to a bottom frame 16. Bottom frame 16 has portions 20 for conventional fastening to a vehicle. Top frame 14 has portions 22 for fixed connection to a vehicle seat.

The vehicle seating system 10 isolates a driver or other passenger from vibrations which would otherwise be transmitted through the vehicle to the vehicle occupants. In particular, the vehicle seating system 10 provides fore/aft isolation for those occupants seated atop the vehicle seating system. It has been recognized that occupants subjected to fore/aft vibrations for prolonged periods of time suffer from more than a mere annoyance. With prolonged exposure to fore/aft vibrations, occupants tend to become more quickly fatigued because of the tendency of the human body to resist the effects of such vibrations. Over years of exposure to vibrations of this type, vehicle occupants may experience trouble in their joints and internal organs, for example. Various systems have been proposed in the past to provide fore/aft isolation. However, the need for improved isolation remains as an important objective of vehicle manufacturers as well as operators of fleet systems, especially fleets including relatively large trucks and other equipment where forces imposed on vehicle occupants are substantially greater than, for example, passenger vehicles. As will be seen herein, the present invention provides fore/aft isolation which is proportional to an occupant's weight and which therefore reliably provides a desired, effective reaction to fore/aft vibrations.

Referring again to FIGS. 1–8, the middle frame 12 includes two pairs of scissored arms, one pair of arms 30, 32 on the port or left side of the middle frame (see FIG. 1) and another pair of arms 34, 36 on the starboard or right-hand side of the middle frame as can be seen for example in FIG. 4. Each scissor arm has opposed ends and it is preferred that rollers be mounted to each end of the scissor arms. Referring to FIG. 1, for example, four rollers are provided at the forward end 40 of the seating assembly and four rollers are provided at the rear end 42 (see FIG. 6). Rollers 30F and 30A are visible in FIGS. 2 and 4, and rollers 32F and 32A are visible in FIGS. 4 and 1, respectively. Rollers 34F, 34A are visible in FIGS. 1 and 4, respectively, and rollers 36F, 36A are visible in FIGS. 1 and 3, respectively.

Referring to FIG. 1, relatively straight guide tracks are provided for rollers at the forward end 40 of the seating assembly. For example, frame 14 provides straight or linear guide tracks 14A, 14B for rollers 32F, 34F at the left and right sides, respectively. Bottom frame 16 includes straight or linear guide tracks 16A, 16B for rollers 30F, 36F at the left and right sides, respectively.

Figure 2:
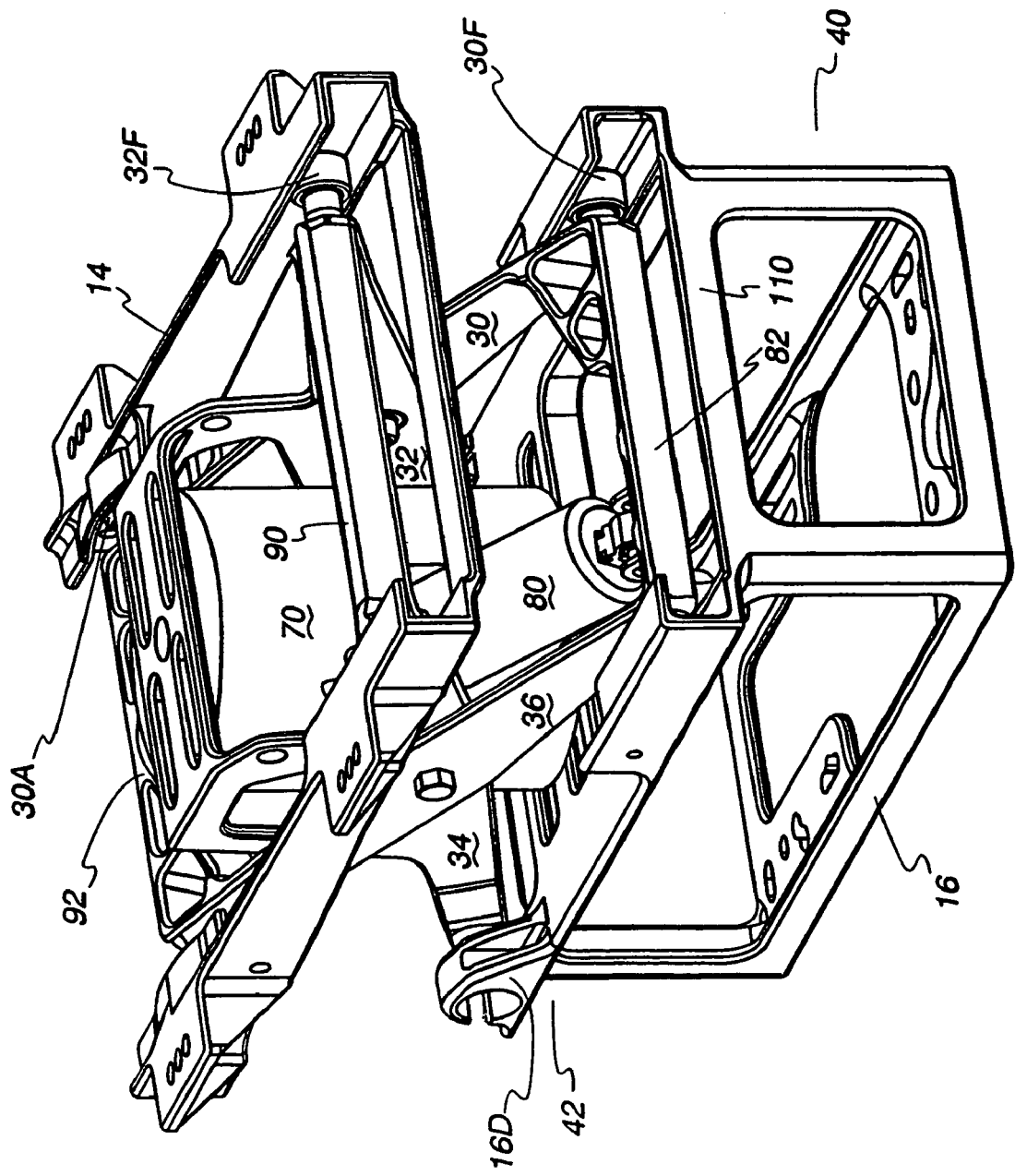

Referring to FIGS. 1 and 2, bottom frame 16 includes sockets 16C, 16D for pivotal connection to rollers 32A, 34A at the left and right sides, respectively. Sockets 16C, 16D provide pivotal connection of the aft ends of scissor arms 32, 34, respectively. Roller and socket combinations are preferred for their smooth operating characteristics. However, if desired, other conventional pivotal connections could be employed.

Figure 8:
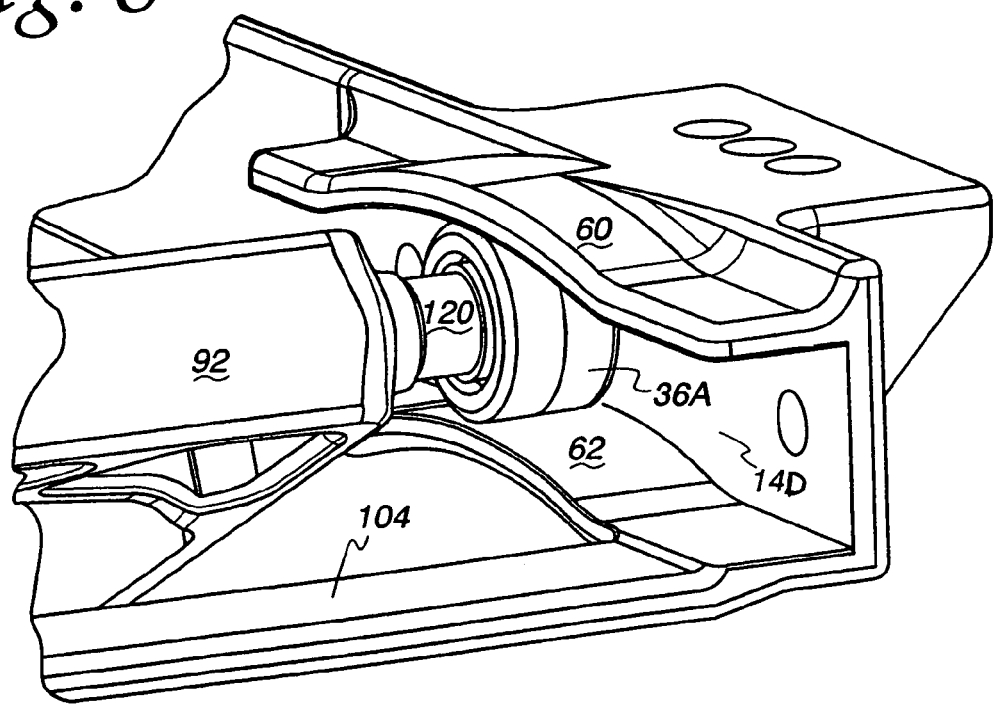
FIG. 8 is a fragmentary view showing a rear portion thereof.

The remaining pair of rollers at the aft, upper ends of the seating assembly are mounted in curvilinear guide tracks 14C, 14D at the left and right sides, respectively. The curvilinear tracks are sometimes referred to as "cups." The curvilinear guide tracks 14C, 14D are convex when viewed from above and concave when viewed from below. With reference to FIG. 8, for example, it can be seen that the curvilinear guide tracks are preferably formed with an upper curvilinear guide wall 60 and a lower curvilinear guide wall 62. As can be seen for example in FIGS. 9–11, the curvilinear guide walls have common centers so as to provide a relatively close fit rolling captivity for the rollers traveling therein to provide a smooth gliding motion, as is preferred in carrying out the present invention. As will be appreciated, the weight of the seat occupant will produce a downward force on the vehicle seating system. For example, with reference to FIG. 8, the downward force will be applied on upper curvilinear guide wall 60 which is transferred to roller 36A, producing increased rolling resistance compared to a "no-load" condition. While roller 36A is free to travel back and forth along the cup or curvilinear guide track, greater rolling resistance will be experienced with heavier seat occupants, and thus the response time will be proportionally slower for heavier occupants. However, whatever weight an occupant may impose on the vehicle seating system, motion of the upper frame part is a smooth gliding motion to provide an improved smooth dissipation of fore/aft vibrational forces. The scissor action provided by pivotally connected scissor arms 30, 32 and pivotally connected scissor arms 34, 36 allows the forward end of the vehicle seating assembly to accommodate the slight vertical excursions of the aft cups or curvilinear guide tracks 14C, 14D.

Referring again to FIGS. 1–8, an air spring 70 is held captive between deck portions 72, 74 of the upper and lower frames 14, 16, respectively. If desired, the air spring 70 could be replaced by conventional mechanical suspensions. However, the use of an air spring suspension is preferred because its natural frequency can be held more constant and automatic adjustments (by altering the internal pressure of the air spring) can be made to accommodate occupants of different weights. A dash pot or shock absorber type device 80 is pinned at one end to a cross member 82 spanning the forward ends of scissor arms 30, 36. Referring to FIG. 1, the remaining free end of dash pot 80 is pinned at 86 to the pivotal connection of scissor arms 34, 36.

Figure 3:
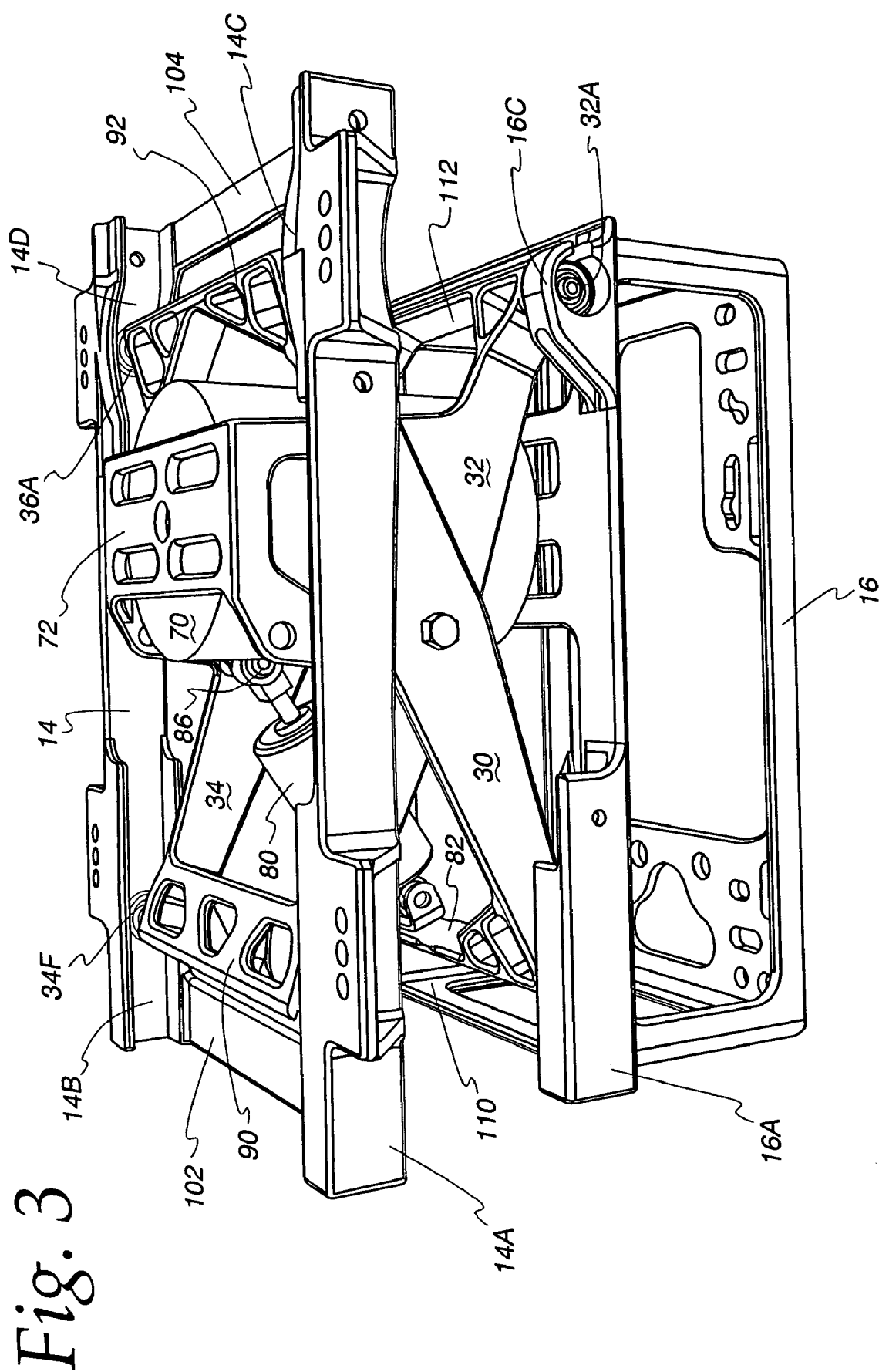
Figure 4:
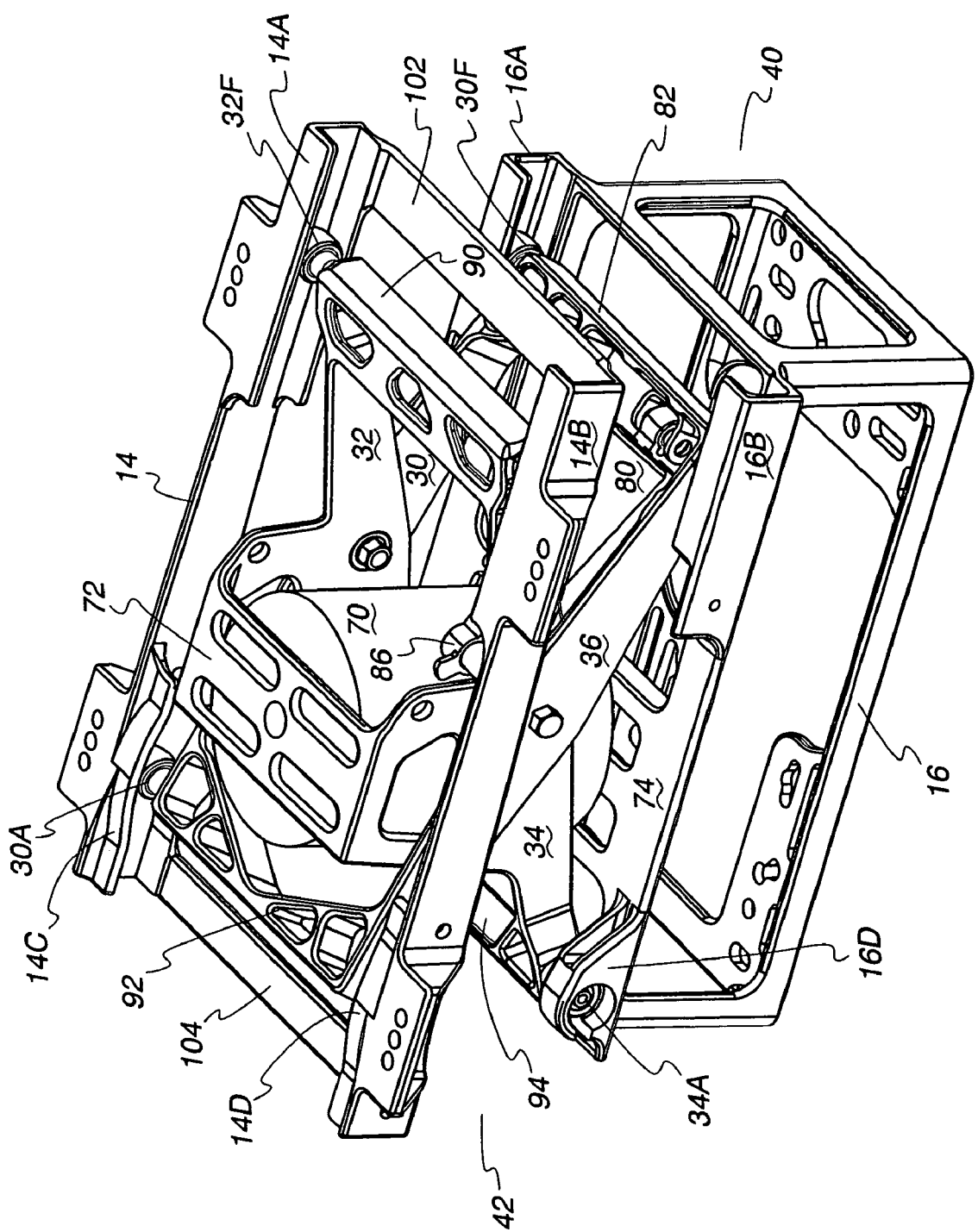
Figure 5:
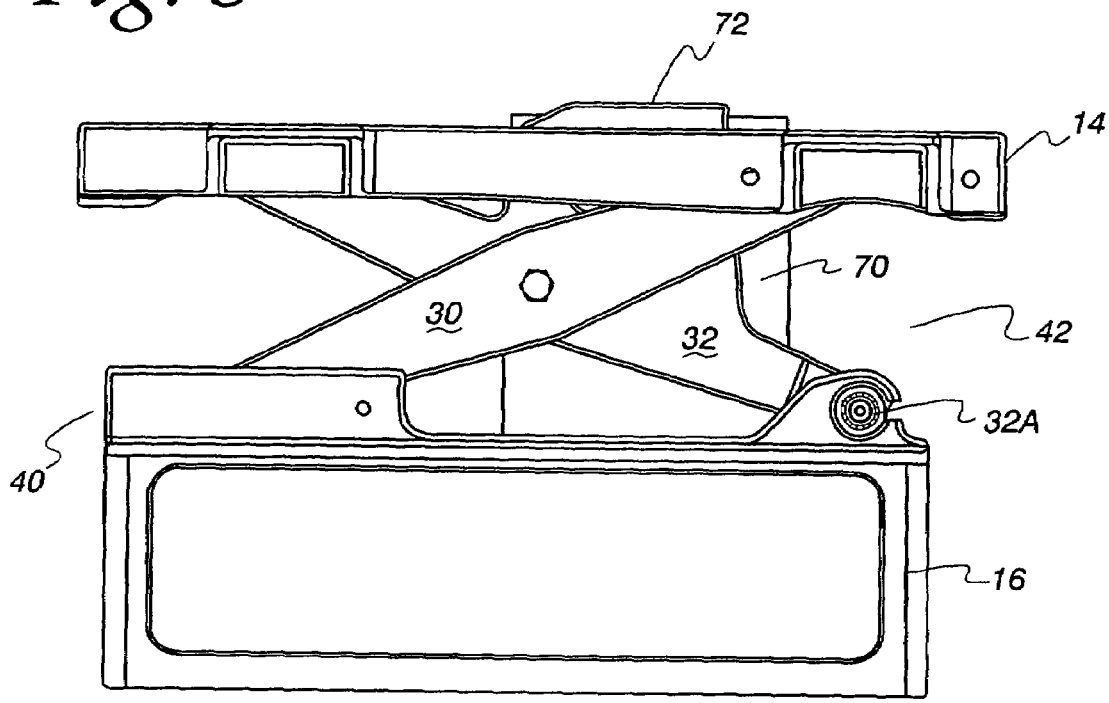
FIG. 5 is a side elevational view thereof.
Figure 6:
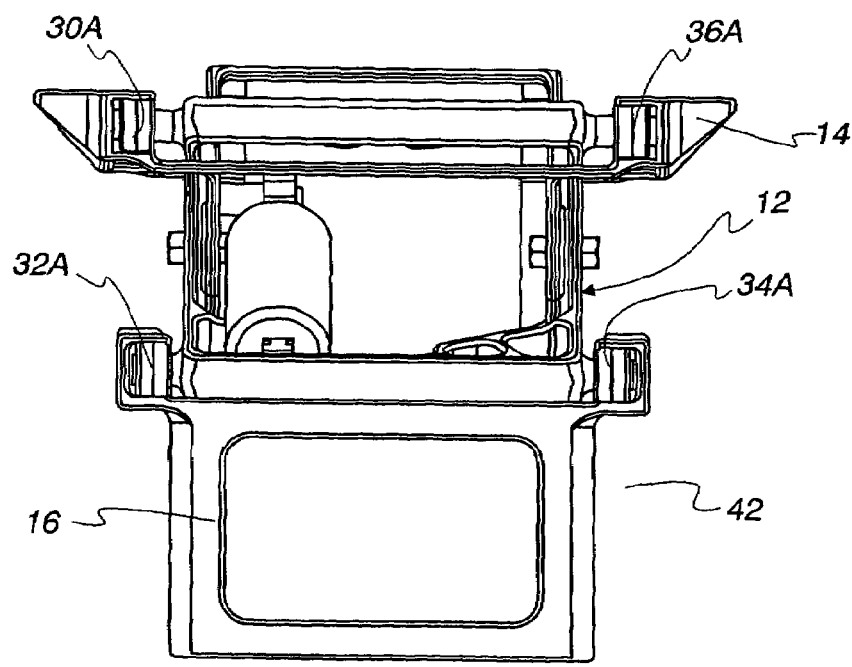
FIG. 6 is an end elevational view thereof.
Figure 7:
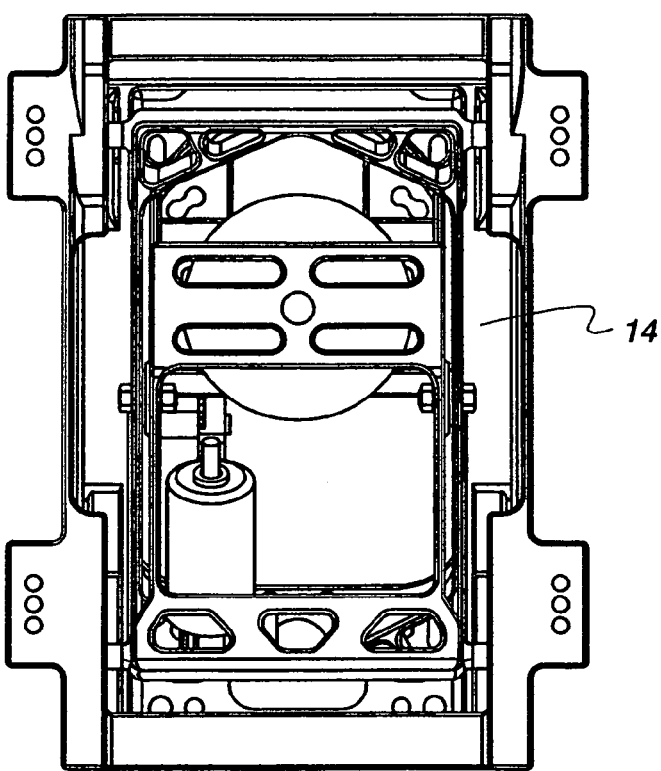
FIG. 7 is a top plan view thereof.

As mentioned, the forward ends of scissor arms 34, 36 are connected together by a cross brace 82. In a similar fashion, a cross brace 90 connects the forward ends of scissor arms 32, 34, a cross brace 92 connects the aft ends of cross arms 30, 36 and a cross brace 94 connects the aft arms of scissor arms 32, 34. As can be seen for example in FIGS. 4 and 7, upper frame 14 has a generally rectangular shape when viewed from above, with cross member 102 connecting linear guide tracks 14A, 14B and cross member 104 connecting cups or curvilinear guide tracks 14C, 14D. The lower frame 16 has members cooperating to form a six sided rectangular box with open walls. As can be seen in FIG. 4, frame 16 includes a transverse member 110 spanning linear guide tracks 16A, 16B and, with reference to FIG. 3 frame 16 at its upper, after end has a cross member 112 connecting guide sockets 16C, 16D. As can be seen in FIGS. 1 and 4, the deck 74 supporting the bottom end of air spring 70 spans the cross members 110, 112.

With reference to FIG. 8, roller 36A is supported on a shaft 120. Shaft 120 may be pivotally supported at the right-hand end of cross member 92 as seen in FIG. 8. With reference to FIG. 3, cross member 92 is preferably provided as a web member spanning the distance between rollers 36A, 30A. If desired, to achieve advantages explained herein, shaft 120 (see FIG. 8) could be made to span the distance between rollers 36A, 30A so as to provide continuous support for the rollers at the aft end of the upper frame 14.

As can be seen from the above, an improved isolation is provided for occupants seated atop the vehicle seating system 10. Upon application of fore/aft vibrations, upper frame 14 freely reciprocates back and forth in a generally horizontal direction except for a slight vertical excursion that the upper aft end imparted by operation of cups or curvilinear guide tracks 14C, 14D. It is generally preferred, in carrying out the present invention, that pairs of scissor arms be glidingly supported by a single pair of cups or curvilinear tracks, a single pair of pivotal connections and two pairs of linear guide tracks located at the forward end of the vehicle seating system. The scissor arms employed can take virtually any conventional shape including the straight scissor arm shaped visible for example in FIG. 3 and the offset or staggered scissor arm shape visible in FIGS. 9–11. If desired, the dash pot 80 described above could be located at other portions of the vehicle seating assembly. For example, as shown in FIGS. 9–11, dash pot 80 is connected between the upper end of frame 16 and the forward end of scissor arm 34.

Figure 9:
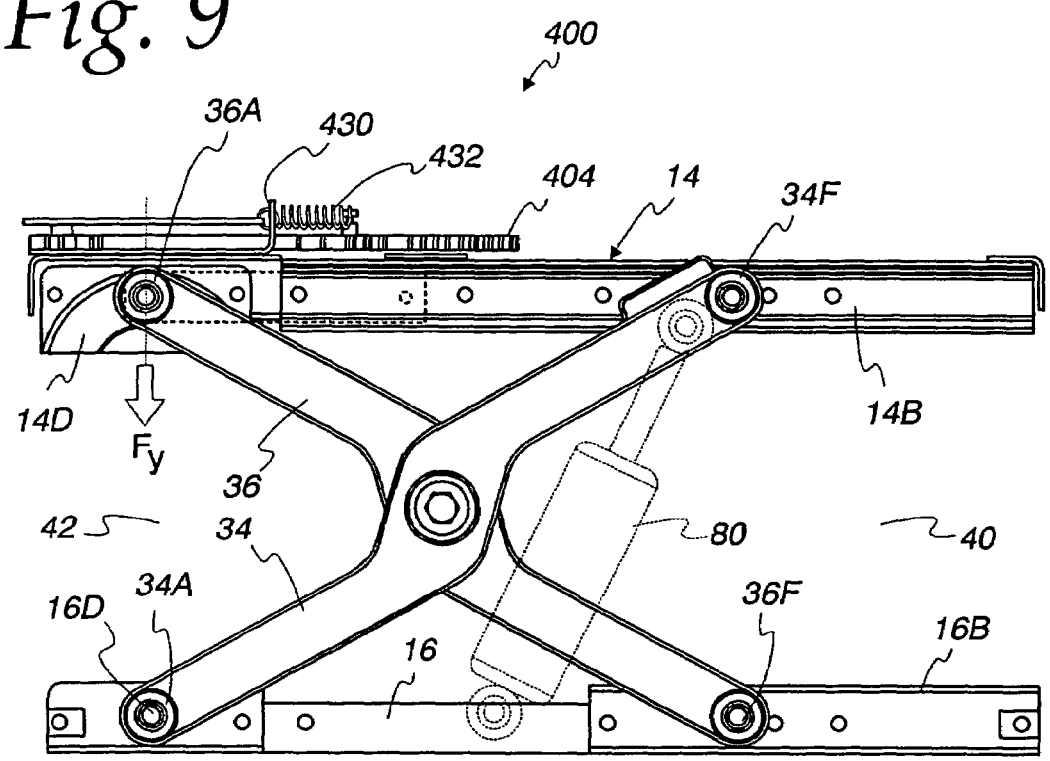
FIGS. 9–11 are side elevational views showing operation of the vehicle seating system.
Figure 10:
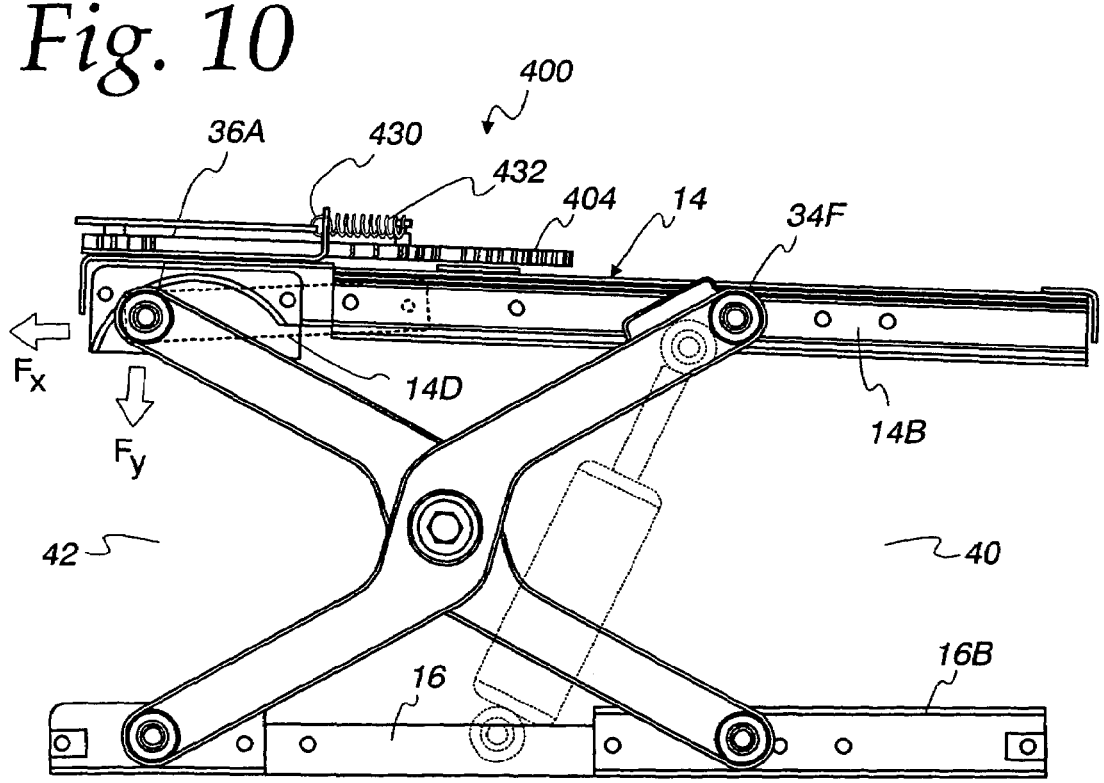
Figure 11:
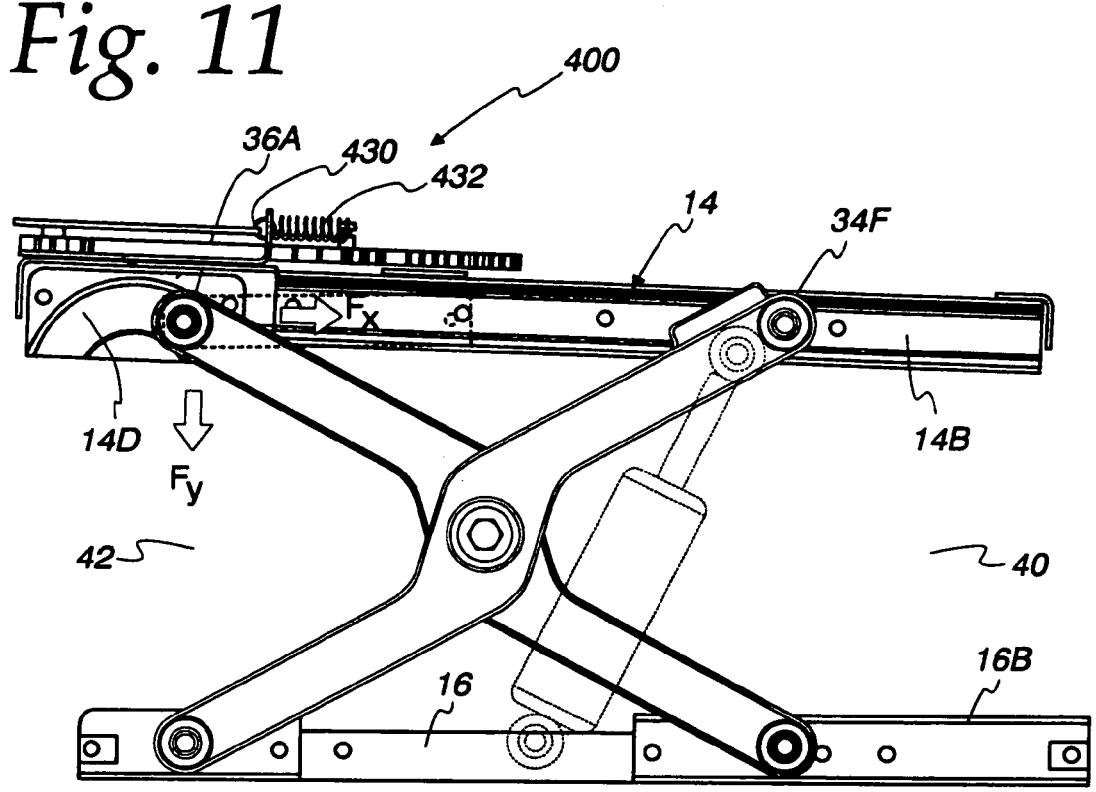

Referring now to FIGS. 9–11, a sequence of operation of the vehicle seating system is shown. At the instant in time shown in FIG. 9, roller 36A is located at a midpoint of cup or curvilinear guide track 14D. A downward force is imparted to the upper end of the roller through the upper guide wall of the cup. Downward force components carried by the aft end of scissor arm 36 is transmitted through the bottom of roller to the bottom curvilinear wall of cup 14D. FIG. 10 shows the resulting operation caused by a forward acceleration of the vehicle, causing the roller 36A to move to the left or rearward extent of cup 14D. In FIG. 11, roller 36A moves to the forward end of cup 14D in response to a rearwardly directed acceleration imparted by the vehicle to the lower, fixedly mounted frame 16. In FIGS. 9–11 it will be appreciated that upper movable 14 frame follows the displacement of roller 36A which supports the frame. As fore/aft vibrations are experienced by the vehicle, upper movable frame 14 reciprocates back and forth, in force-dissipating response.

The dynamic fore/aft properties of the system can be adjusted. The radius of curvature of the cups may be altered in different systems to provide a desired natural frequency for fore/aft motion. The relationship between the natural frequency and the radius of curvature of the cups is approximated by the formula:

$$f_n = \left(\frac{1}{2\pi}\right)\sqrt{\frac{N_{cups}g}{N_{contacts}R}}$$

where, $f_n$=natural frequency, g=local gravitational constant, $N_{cups}$=number of cups, $N_{contacts}$=4, number of contact points 22 between the top frame 14 and the vehicle seat, and R=radius of curvature of cups.

The radius of curvature also determines the force deflection characteristic, or effective spring rate, for fore/aft motion. The relationship between the radius of curvature and effective spring rate in the fore-aft direction is given by the formula:

$$k_x = \frac{N_{cups}w}{N_{contacts}}\left(\frac{(R^2-x^2)^{1/2}+x^2(R^2-x^2)^{-1/2}}{(R^2-x^2)}\right)$$

where x=displacement in the fore-aft direction and w=effective seat/occupant weight. The effective spring rate is fairly constant for a given radius of curvature with slight variations for different displacements in the fore-aft direction.

In the preferred embodiment, the natural frequency of fore/aft isolator is in the range of 0.60 to 1.20 Hertz for the effective isolation of fore/aft motions typical of commercial vehicles. To produce a natural frequency of 0.60 Hertz, the radius of curvature of the cups is set to approximately 13.60 inches, resulting in an effective spring rate of about 7.40 lbs/inch. To produce a natural frequency of 1.20 Hertz, the radius of curvature of the cups is set to approximately 3.40 inches, resulting in an effective spring rate of roughly 30.00 lbs/inch. The most preferred natural frequency for fore/aft motion is 1.00 Hertz. This frequency corresponds roughly to a radius of curvature of 5.00 inches and an effective spring rate of 20.00 lbs/inch.

The dynamic vertical motion properties of the system can also be adjusted. The natural frequency of vertical motion is related to the force deflection characteristic, or spring rate, for vertical motion, as defined by the following formula:

$$f_n = \left(\frac{1}{2\pi}\right)\sqrt{\frac{k_y}{w/g}}$$

where, $f_n$=natural frequency, g=local gravitational constant, and $k_y$=spring rate for vertical motion. The internal pressure of air spring 70 automatically adjusts to the change in weight (w) associated with different occupants.

In the preferred embodiment, the natural frequency of vertical motion is in the range of 0.50 to 1.20 Hertz for the effective isolation of vertical motions typical of commercial vehicles. To produce a natural frequency of 0.50 Hertz, the spring rate is set to about 5.11 lbs/inch. To produce a natural frequency of 1.20 Hertz, the spring rate is set to about 30.00 lbs/inch. The most preferred natural frequency of vertical motion is 0.70 Hertz. This natural frequency of vertical motion corresponds to a spring rate of 10.00 lbs/inch.

The amount of fore/aft displacement of the upper movable frame 14, and hence the seat attached to it, can be readily adjusted by the occupant. Referring to FIGS. 12–16, and initially to FIG. 13, shaft 120 extends the width of the upper frame part 14, from roller 30A (see FIG. 13) to roller 36A (see FIG. 8). A shuttle 170 has a hole 172 for receiving shaft 120 and is free to rotate about the shaft. A bumper 176 having fore and aft surfaces 178, 180 is mounted atop shuttle 170. Bumper 176 is preferably made of rubber or other resilient material. Less preferably, the bumper could be made of non-resilient material.

Figure 12:
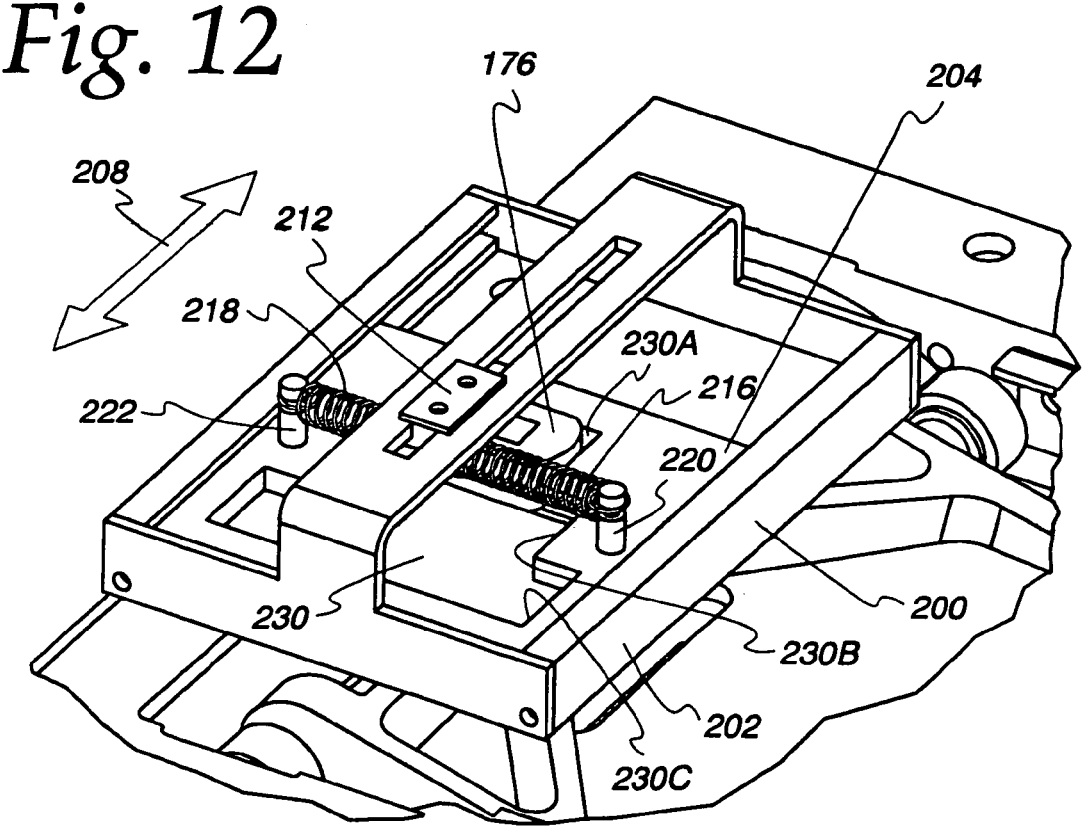
FIG. 12 is a fragmentary perspective view showing the regulation system thereof.
Figure 13:
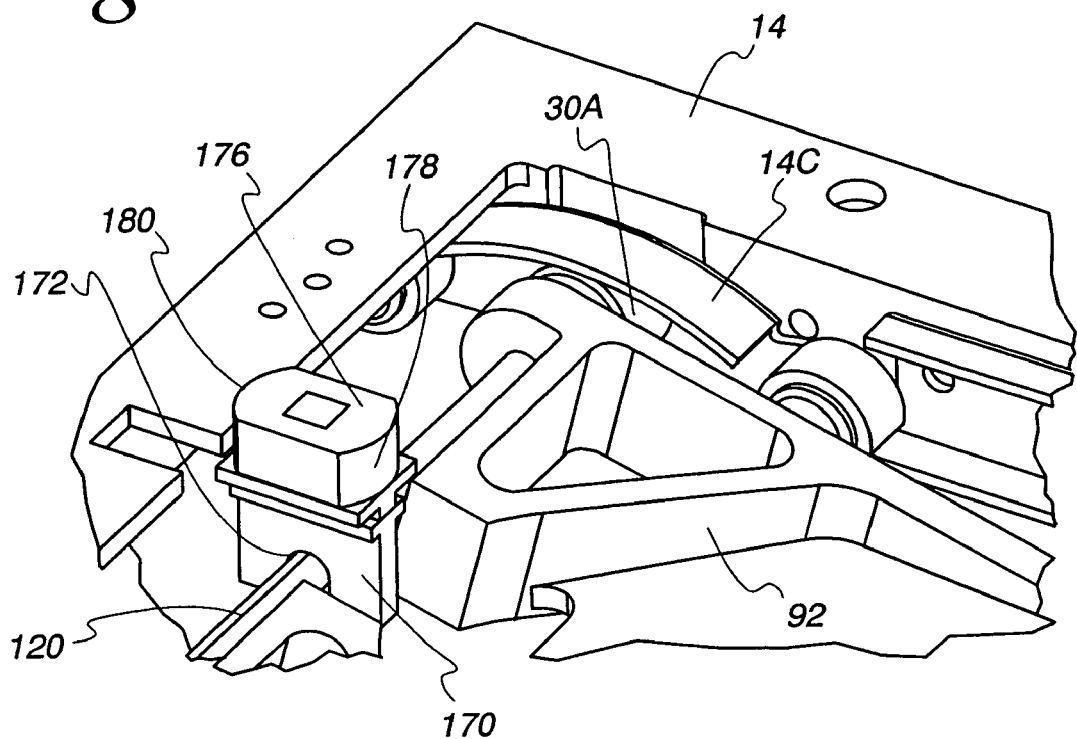
FIG. 13 is a fragmentary perspective view of a portion of the regulation system.

With reference to FIG. 12, a slide assembly or fore/aft regulator system 200 is provided at the aft end of the vehicle seating assembly and is positioned atop upper frame 14. Fore/aft regulator system 200 includes a slide frame 202 which is fixed in position, and a gate 204 mounted for lateral reciprocation within frame 202, in a direction of arrow 208 shown in FIG. 12.

Figure 14:
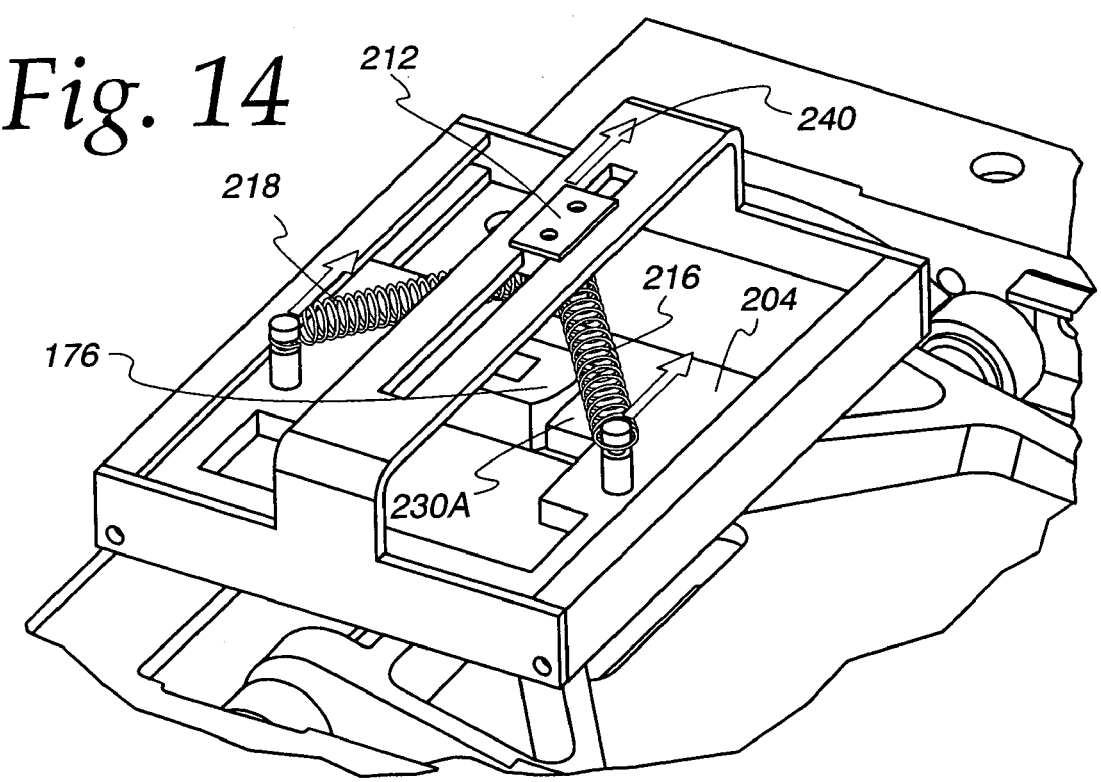
FIGS. 14 and 15 are fragmentary perspective views showing operation of the regulation system.

Gate 204 is coupled to a spring carrier 212 through a vector pair of selector springs 216, 218 which are, in turn, secured to gate 204 by pins 220, 222, respectively. As can be seen in FIG. 12, gate 204 has a stepped opening 230 with step portions 230A, 230B and 230C arranged sequentially in increasing size. With reference to FIG. 16, a cable 234, connected to spring carrier 212 applies tension to a return spring 238. Tension is applied in the direction of arrow 242 in FIG. 16. This imparts a force to gate 204 through selector springs 216, 218 which urges the gate in a direction of arrow 242, moving the gate with respect to bumper 176. As cable 234 is tensioned in the direction of arrow 242, gate 204 is urged from the position shown in FIG. 14 (with bumper 176 in gate opening 230A) to the position shown in FIG. 15, (with the bumper located in the larger gate opening 230C). As indicated in FIG. 14, force is applied to spring carrier 212 in the direction of arrow 240, causing spring carrier 212 to distort the selector springs 216, 218 in the manner indicated in FIG. 14. As a result, spring force is applied to gate 204 to move the gate in the direction of arrow 240. The vector spring system 216, 218 limits the amount of maximum force that the cable has to overcome, (so that the cable does not have to overcome the locking force of the gate against the bumper).

Figure 15:
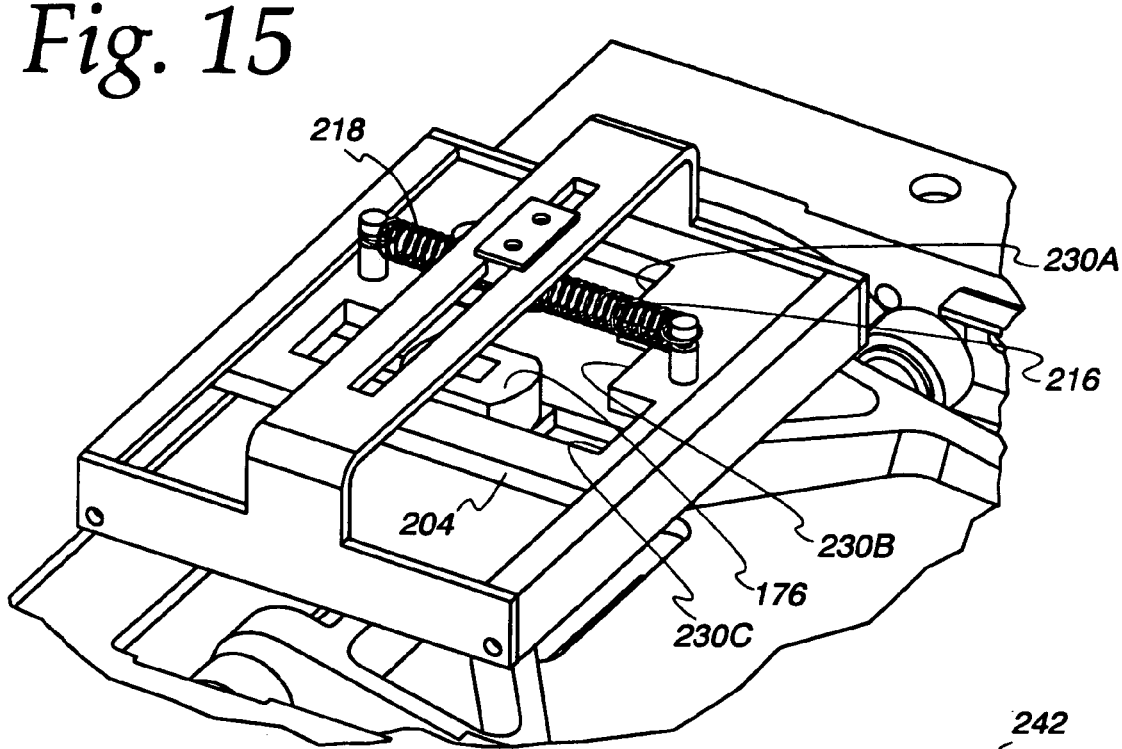
Figure 16:
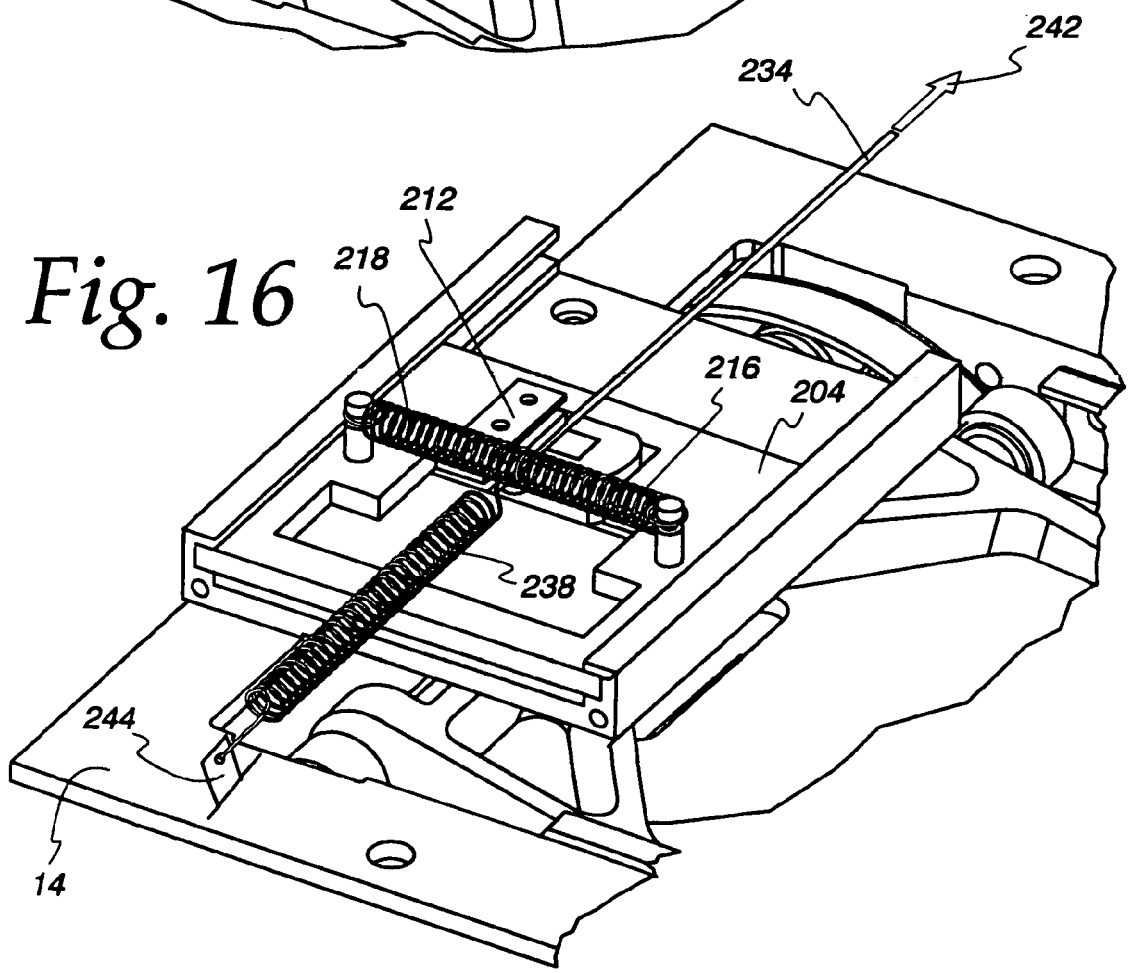
FIG. 16 is a fragmentary perspective view showing further operation of the regulation system.

Eventually, the gate 204 assumes the position shown in FIG. 15 with the selector springs 216, 218 achieving a relaxed position, as indicated. With reference to FIG. 16, return spring 238 is secured at one end to spring carrier 212 and at the other end to a securement 244 on upper frame 14. The selector spring 238 limits the amount of tension which can be applied to the system by cable 234. In the preferred embodiment, cable 234 is terminated by a detented user engageable adjustment handle of conventional construction allowing displacement of the cable by three different amounts corresponding to the stepped openings in gate 204.

Preferably, the first stepped opening 230A is dimensioned for close engagement with bumper 176 as shown for example in FIGS. 12, 14 and 16. This prevents the bumper from moving fore and aft, and provides a complete "lock out" with no fore/aft motion. The selector springs provide a vector spring system which, with operation of cable 234 urges gate 204 to bring gate stepped openings of increased size about bumper 176. In the extreme position illustrated in FIG. 15, bumper 176 is allowed the greatest range of travel within stepped slot 230C. Step 230B provides an intermediate position allowing the bumper an intermediate range of travel. Three stepped openings are shown in the figures. However, more or less stepped openings can be provided, as desired and such is contemplated by the present invention.

Figure 17:
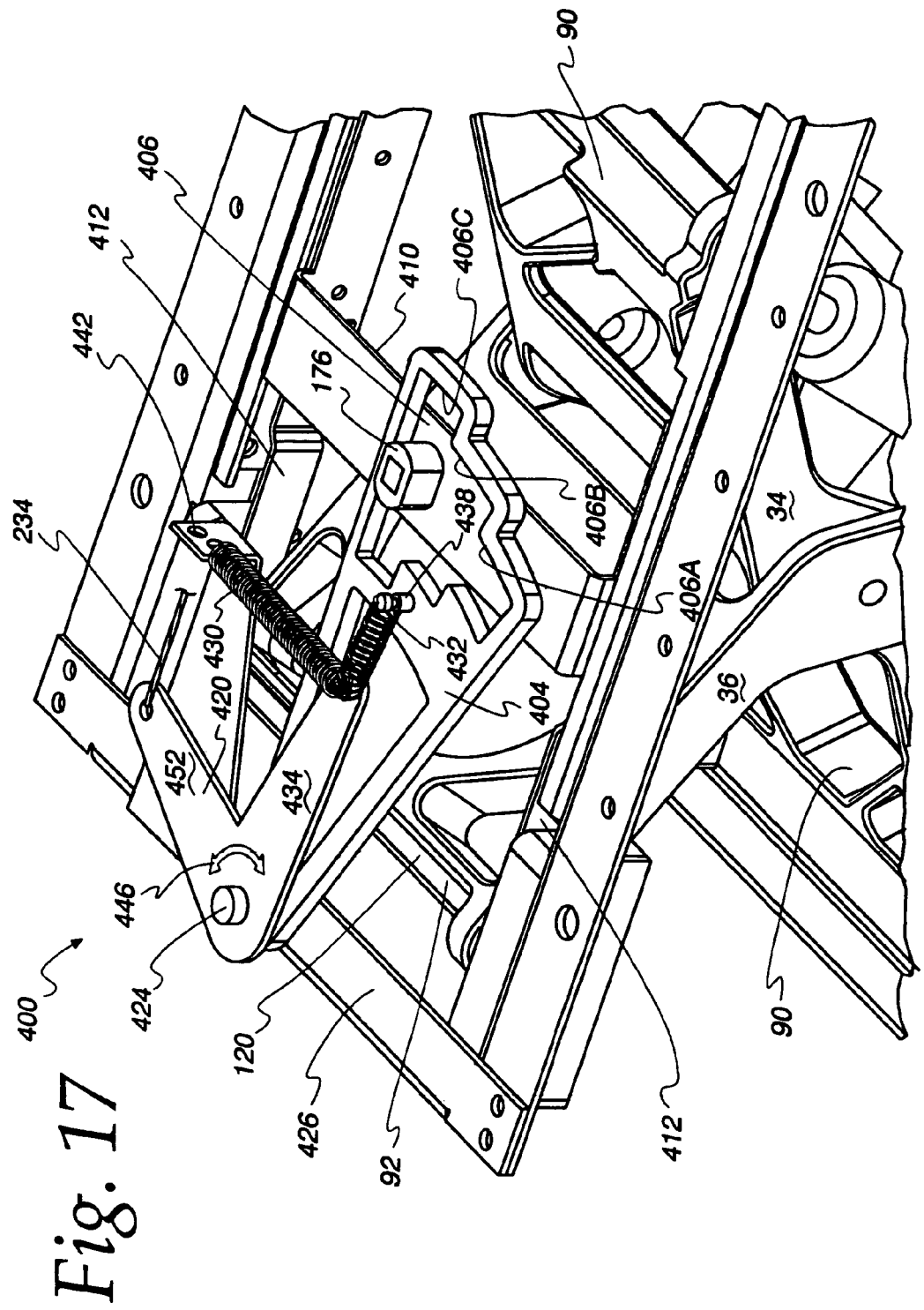
FIG. 17 is a fragmentary perspective view showing an alternative regulation system.

Turning now to FIG. 17, an alternative arrangement of a fore/aft regulator system, is generally indicated at 400. As can be seen in FIG. 17, the slide frame has been eliminated, and the sliding gate has been replaced with a pivoting gate indicated at 404. Gate 404 includes a stepped opening 406 with stepped slots 406A, 406B and 406C. Bumper 176 is mounted to a carriage 410 which includes drive links 412 connected to axle or shaft 120. An operator 420 is pivotally connected at 424 along with gate 404 to cross member 426. The return springs 430, 432 are connected to the free end of operator arm 434. The remaining end of return spring 432 is supported by pin 438 coupled to gate 404. The remaining end of return spring 430 engages a bracket 442. As operator 420 pivots in the direction of arrow 446, vector return springs 430, 432 provide a vector spring action similar in function to the vector spring arrangement described above. Operating cable 234 is connected to the free end of operator arm 452. As tension is applied to cable 234, operator 420 is pivoted in a clockwise direction, moving gate 404 to bring stepped slot 406C adjacent bumper 176, allowing an extended range of fore/aft travel. As indicated in FIG. 17, vector return springs 430, 432 are stretched, storing a return force to urge gate 404 to travel in a counterclockwise direction bringing the small step slot 406 adjacent bumper 176, as tension in cable 234 is relaxed. The fore/aft regulator system 400 is shown in FIGS. 9–11.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

The invention claimed is:

1. A vehicle seating system for supporting a vehicle seat within a vehicle comprising:
    a top frame with a top mounting arrangement for securement to the vehicle seat;
    said top frame having forward and rearward ends disposed between opposed sides, and four corners with a roller track at each corner;
    a bottom frame with a bottom mounting arrangement for securement to the vehicle;
    said bottom frame having forward and rearward ends disposed between opposed sides, and four corners with a roller track at each corner;
    a linking system for movably mounting the top frame to the bottom frame, the linking system including pairs of scissor arms pivotally connected to one another, located at opposed sides of said top and said bottom frames, with ends of said scissor arms carrying rollers;
    the roller tracks at the rearward end of the top frame being generally curvilinear so as to confine rollers contained therein to a curvilinear motion, the roller tracks at the rearward end of the bottom frame pivotally holding rollers disposed therein and the remaining roller tracks being generally linear so as to confine rollers disposed therein to generally straight line motion; and
    a regulator system for regulating the amount of fore and aft travel of said top frame.

2. The vehicle seating system of claim 1 wherein the regulator system is adjustable between two or more positions, one position substantially preventing fore and aft travel of the top frame and the other one or more positions permitting a predetermined limited amount of fore and aft travel of the top frame.

3. The vehicle seating system of claim 1 wherein the regulator system comprises:
    a lock out mechanism to substantially prevent fore and aft travel of the top frame when the regulator system is in a first position;
    a bumper moveable between two stops for limiting the amount of fore and aft travel of the top frame when the regulator system is in a second position; and
    a selector arrangement for selecting between the first and second positions.

4. A regulator system for use in a vehicle seating system which supports a vehicle seat within a vehicle, including a top frame with a top mounting arrangement for securement to the vehicle seat, a bottom frame with a bottom mounting arrangement for securement to the vehicle and a linking system for moveably mounting the top frame to the bottom frame, the regulator system absorbing external forces and regulating the amount of fore aft travel of said top frame during movement of the vehicle, said regulator system comprising:
    a lock out mechanism to substantially prevent fore and aft travel of the top frame when the regulator system is in a first position;
    a bumper moveable between two stops for limiting the amount of fore and aft travel of the top frame between two different limits of travel during movement of the vehicle when the regulator system is in a second position; and
    a selector arrangement for selecting between the first and second positions.

\* \* \* \* \*